Aug. 15, 1967

C. LAIRD 3,335,894

HOLDER FOR EGGS

Filed July 15, 1965

INVENTOR.
CECIL LAIRD
BY John R. Walker, III
Attorney

United States Patent Office 3,335,894
Patented Aug. 15, 1967

3,335,894
HOLDER FOR EGGS
Cecil Laird, 4003 Trevathan, Memphis, Tenn. 38109
Filed July 15, 1965, Ser. No. 472,183
1 Claim. (Cl. 220—21)

ABSTRACT OF THE DISCLOSURE

A portable lightweight disc-shaped egg holder particularly designed for containing or packaging a plurality of eggs. The egg holder including an egg receiving body part and a lid part removably secured on the body part. The egg holder body and lid parts each being preferably mold-formed of expanded polyethylene material having substantial temperature and vibration insulating qualities.

---

This invention relates to packaging structures generally and particularly to a holder for eggs.

An object of the present invention is to provide a sturdy, lightweight egg holder comprising two integrally formed parts of polystyrene or other such material.

A further object is to provide an egg-holder of substantially simple construction that does not have to be erected as a box for use, and that does not require excelsior, sawdust, or other such material for packing or cushioning the eggs.

A further object is to provide en egg-holder that is easy to use, that may be reused over and over again, or may be disposed of after being used one time.

A further object is to provide an egg-holder having insulating properties and a holder that keeps eggs cool while transferring them from the freezer at the store to the refrigerator in the home.

A further object is generally to improve the design and construction of packaging structures of eggs.

The means by which the foregoing and other objects of the present invention are accomplished and the manner of their accomplishment may be readily understood upon reference to the accompanying drawings in which.

Figure 1:
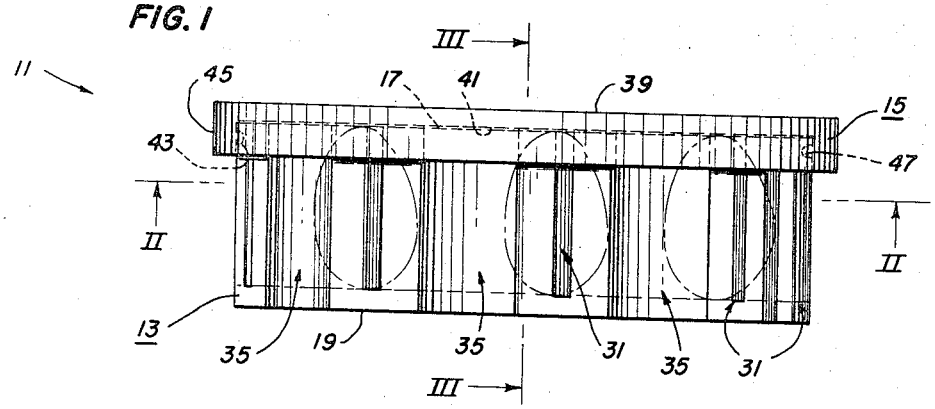
FIG. 1 is a side elevational view of the egg-holder structure of the present invention and illustrating the eggs in broken lines.
Figure 2:
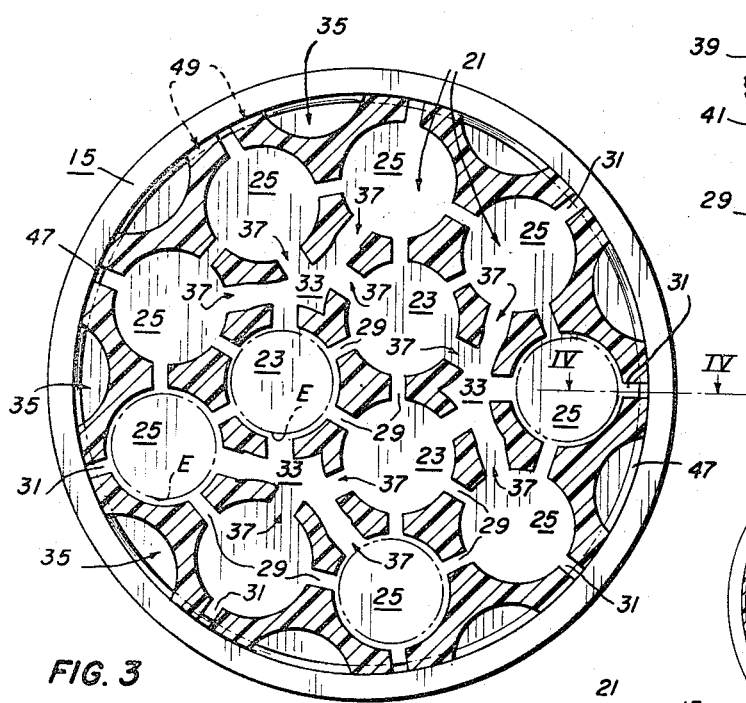
FIG. 2 is a horizontal plane sectional view taken on line II—II of FIG. 1.
Figure 3:
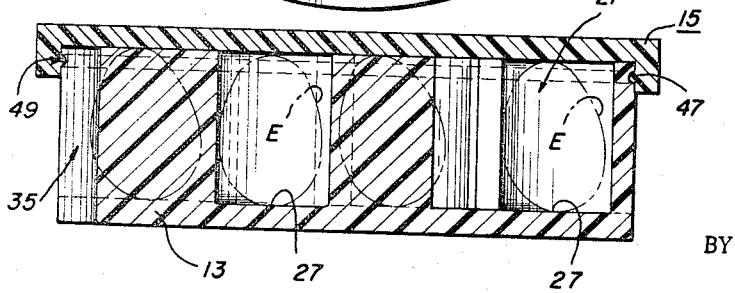
FIG. 3 is a vertical plane diametric sectional view taken as on the line III—III of FIG. 1.
Figure 4:
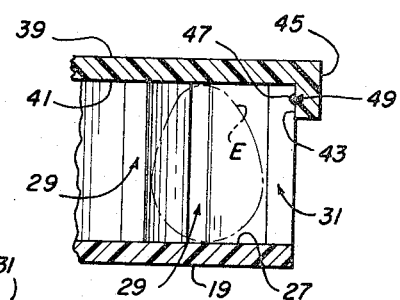
FIG. 4 is a fragmentary vertical plane sectional view taken as on the line IV—IV of FIG. 2.

Referring now to the drawings in which the various parts are indicated by reference characters, the egg-holder indicated by numeral 11 includes a body part indicated by numeral 13 and a lid part indicated by numeral 15. The body and lid parts respectively preferably are formed of polystyrene synthetic granulated material. The body part and lid part are respectively integrally formed by placing the granulated polystyrene in a form or mold, heating the mold and expanding the polystyrene to the desired shape.

The shape or configuration of the egg-holder structure may be varied somewhat to accommodate various numbers of eggs. In the following description, however, the invention will be described in its preferred form and of a size for holding twelve eggs. Preferably, the egg holding structure is in the shape of a thick disc or is of short cylindrical configuration. For clarification in description the invention will be described in the disposition shown in FIG. 1, namely, in a flat or horizontally extending disposition.

Egg-holder body part 13 is provided with an upper plate 17, a lower plane 19, and structure defining a plurality of sockets indicated generally by numeral 21. Sockets 21 include an inwardly disposed group of three sockets indicated respectively by numerals 23 and an outwardly disposed group of nine sockets indicated respectively by numerals 25. Sockets 23 are equally spaced 120 degrees apart about the center axis of body part 13. Sockets 25 are equally spaced respectively 40 degrees apart and positioned in somewhat staggered arrangement relative to sockets 23.

Each socket of plurality of sockets 21 is substantially alike and each includes a circular bottom surface indicated respectively by numeral 27. Each socket 21 intersects and provides a circular opening in upper plane 17 of body part 13 and bottom circular surface 27 of each sockets is substantially parallel with the lower plane 19 of the body.

Body 15 includes structure defining a plurality of slotted apertures including inwardly disposed apertures indicated respectively by numerals 29 and outwardly disposed apertures indicated respectively by numerals 31. Slotted apertures 29 respectively provide passages connecting adjacent pairs of sockets; apertures 31 provide passages respectively connecting outwardly disposed sockets 25 with the space outside body part 13.

For reducing the weight of body part 13 and for reducing the amount of material in forming the part, three recesses indicated respectively by numeral 33 and nine semi-cylindrical scallop-like recesses 35 are provided in the body. Recesses 33 are spaced equally 120 degrees apart, arranged concentrically in body part 13, and disposed substantially between inwardly and outwardly disposed groups of sockets 23, 25, respectively. Scallop-like recesses 35 respectively are equally spaced 40 degrees apart and are formed respectively in the circular peripheral portion of the body part. In addition to reducing the weight and material of the body, recesses 33 respectively provide finger-access means for retrieving the eggs from sockets 21; enlarged slotted apertures 37 respectively provide means for inserting the finger under or around a respective egg for retrieving the egg from the socket. Slotted apertures 29 respectively are longitudinally U-shaped and open respectively into upper plane 17 of the body part. Opposingly disposed sidewall surfaces and a bottom surface define respectively each aperture of slotted apertures 29, 31 and 37. The depth of each slotted aperture is coextensive with the depth of each socket 21 and the circular bottom surface 27 of each socket is co-planar respectively with the bottom surface of each slotted aperture.

Lid part 15 is substantially disc-shaped and has an upper plane 39 and an under plane 41. The circular peripheral portion of lid part 15 is downwardly flanged and has an inwardly disposed cylindrical surface 43 and an outwardly disposed cylindrical surface 45 concentrically arranged with surface 43.

Detent means is provided for removably holding lid part 15 and body 13 together and preferably is as follows: The flanged portion of lid part 15 is provided with a ring-like rib portion 47 projecting inwardly and around cylindrical surface 43. The circular peripheral portion of body part 13 includes structure defining groove means around the circular periphery of the body and on opposite sides respectively of each slotted aperture 31 is provided a pair of grooves indicated respectively by numerals 49. The relative arrangement of lid part rib portion 47 and body part grooves 49 is such that, with the lid on the body part in place and covering the plurality of egg receiving sockets, the under plane 41 of the lid part abuttingly engages the upper plane 17 of the body part.

Figure 5:
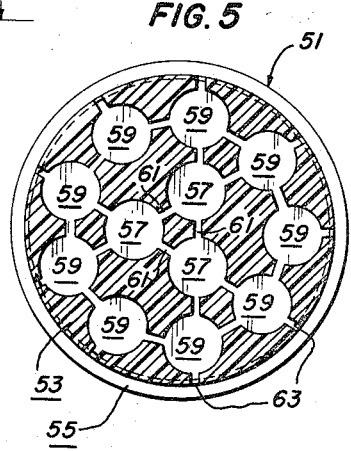
FIG. 5 is a view, similar to FIG. 2, of another embodiment of the egg-holder structure of the present invention.

The embodiment illustrated in FIG. 5 is like the above described embodiment except for the exclusion of the weight and material reducing means; that is, except for the exclusion of vertically extending recesses 33 and scallop-like recesses 35. The alternate embodiment is illustrated by numeral 51 and includes a body part 53 and a lid part 55. Body part 53 includes structure defining a plurality of sockets including inwardly disposed sockets 57 and outwardly disposed sockets 59. A plurality of slotted apertures 61 provide passages respectively between adjacent sockets in the body part, and a plurality of slotted apertures 63 provide passages respectively between outwardly disposed socekts 59 and the space outside the body. Lid 55 of embodiment 51 is removably secured to body part 53 in like manner as in embodiment 13.

The eggs are indicated respectively by letter E. The diameter and depth respectively of each of the sockets are of a size corresponding to the size egg being packaged. Each socket is of a size slightly larger than the diameter or minor axis of the egg and the depth of each socket is slightly less than the length or major axis of the egg. The interior proportion of each socket is such that when an egg is held in a socket and the lid part is in place, the egg is supported vertically along the major axis and by lid part upper planes 17 and the bottom surface 27 of the respective socket. Since the polysterene material is readily deformable, the respective upper and lower end portions of the egg deform respectively the under surface of the lid and the bottom surface of the socket and snugly hold the egg. When it is desired to remove an egg from a socket, the user has only to insert a finger in the appropriate slotted aperture 37 and remove the egg. In the embodiment illustrated in FIG. 5 which does not include finger-grip means or enlarged slotted apertures for removing the eggs, body part 53 may be fractured along the bottom portion; and egg or eggs of embodiment 51 may be readily removed by breaking portions of body part 53 at the respective slotted apertures 59, 61.

The egg-holder structure of the present invention provides a sturdy, lightweight, economical means for packaging eggs. The egg-holder is of substantially simple construction and eliminates the use of straw, sawdust, excelsior or other such cushioning material. Each egg is compressively supported along the major axis thereof and is held securely. The slotted aperture design of the holder and the insulating properties of the synthetic polystyrene material provide means for keeping the eggs cool and fresh for long periods. In particular, the insulating properties and the slotted aperture design provide means for allowing the cold air to find its way to all of the eggs including the ones near the center of the holder when the holder is in the refrigerator at the grocery store, and yet the eggs will remain cold while transferring them to the refrigerator at home since the cold air has a long and labyringth-type pathway to travel from the center of the holder outwardly.

Although the invention has been described in some detail by way of illustration and example for purposes of clarity and understanding, it is to be understood that it is not to be so limited since changes and modifications may be made therein which are within the full intended scope of this invention as hereinafter claimed.

I claim:

A holder for eggs comprising a body part of one-piece form having an upper plane, a lower plane extending parallel said upper plane and a circular peripheral portion extending around said body part and between said upper and said lower planes, said body part having structure defining a plurality of cylindrical egg receiving sockets respectfully extending substantially parallel one socket with another, said plurality of sockets being arranged in an inwardly disposed group of three sockets spaced equally 120 degrees apart about the center axis of said body part and an outwardly disposed group of nine egg receiving sockets spaced equally 40 degrees apart and contiguous said circular peripheral portion, each socket of said plurality of sockets intersecting and providing a circular opening in said upper plane of said body part, said body part including structure defining a plurality of slotted apertures providing passages respectively connecting adjacent pairs of sockets and also including structure defining a plurality of slotted apertures providing passages respectively connecting said outwardly disposed group of nine sockets respectively with the space outside said body, said body part additionally including structure defining weight and material reducing means comprising three recesses spaced equally 120 degrees apart and arranged between said inwardly and said outwardly disposed groups of sockets, said weight and material reducing means additionally including structure defining nine semi-cylindrical scallop-like recesses extending respectfully substantially parallel the center axis of said body part; a lid part of one-piece form having an under plane; and detent means for removably holding said lid part and said body part together with said lid part covering said plurality of egg receiving sockets and with said under plane of said lid part engaging the upper plane of said body part.

References Cited

UNITED STATES PATENTS

| 586,846 | 7/1897 | Hammer | 217—26.5 |
| 755,640 | 3/1904 | Drake | 217—26.5 |
| 1,173,114 | 2/1916 | Lane | 217—26.5 |
| 1,926,916 | 9/1933 | Reeves | 217—25.5 |
| 3,283,891 | 11/1966 | English | 217—27 XR |
| 3,286,834 | 11/1966 | English | 217—35 XR |

FOREIGN PATENTS 698,373  10/1953  Great Britain.

THERON E. CONDON, *Primary Examiner.*

GEORGE E. LOWRANCE, *Examiner.*